United States Patent
Hamana et al.

(10) Patent No.: US 9,442,430 B2
(45) Date of Patent: Sep. 13, 2016

(54) TRANSFER MEMBER FOR ELECTROPHOTOGRAPHY AND ELECTROPHOTOGRAPHIC APPARATUS

(71) Applicant: CANON KABUSHIKI KAISHA, Tokyo (JP)

(72) Inventors: Eiichi Hamana, Inagi (JP); Yasutomo Tsuji, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 14/714,869

(22) Filed: May 18, 2015

(65) Prior Publication Data
US 2015/0344721 A1 Dec. 3, 2015

(30) Foreign Application Priority Data

May 27, 2014 (JP) ................. 2014-109045
Sep. 5, 2014 (JP) ................. 2014-181360
Mar. 17, 2015 (JP) ................. 2015-054046

(51) Int. Cl.
| | |
|---|---|
| *C08K 5/06* | (2006.01) |
| *G03G 15/16* | (2006.01) |
| *C09D 133/14* | (2006.01) |
| *C08F 220/20* | (2006.01) |
| *C08F 222/10* | (2006.01) |
| *C09D 4/00* | (2006.01) |

(52) U.S. Cl.
CPC ......... *G03G 15/1605* (2013.01); *C09D 133/14* (2013.01); *C08F 220/20* (2013.01); *C08F 2222/1053* (2013.01); *C08K 5/06* (2013.01); *C09D 4/00* (2013.01)

(58) Field of Classification Search
CPC ... C08K 5/06; C09D 133/08; C03G 15/1605
USPC .......................................... 524/366; 399/302
See application file for complete search history.

(56) References Cited

U.S. PATENT DOCUMENTS

2014/0162068 A1 6/2014 Yoshida et al.
2014/0370296 A1 12/2014 Tsuji

FOREIGN PATENT DOCUMENTS

JP 2009-192901 A 8/2009

OTHER PUBLICATIONS

U.S. Appl. No. 14/685,527, filed Apr. 13, 2015. Inventor: Yasutomo Tsuji.

*Primary Examiner* — Edward Cain
(74) *Attorney, Agent, or Firm* — Fitzpatrick, Cella, Harper & Scinto

(57) ABSTRACT

Provided is a transfer member for electrophotography, comprising a substrate and a surface layer on the substrate, wherein the surface layer comprises: an acrylic resin having a hydroxyl group; and a fluorine compound, the fluorine compound having an alkyl group including 1 to 8 carbon atoms, and a fluorine atom substituting at least one hydrogen atom in the alkyl group, and comprising a constitutional unit represented by the following formula (1).

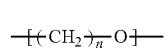

(1)

12 Claims, 2 Drawing Sheets

TRANSFER MEMBER FOR ELECTROPHOTOGRAPHY AND ELECTROPHOTOGRAPHIC APPARATUS

BACKGROUND OF THE INVENTION

1. Field of the Invention

The present invention relates to a transfer member for electrophotography to be used in an image forming apparatus of an electrophotographic system (hereinafter referred to as "electrophotographic apparatus") such as a copying machine or a printer, and to an electrophotographic apparatus.

2. Description of the Related Art

In an electrophotographic apparatus, an electrostatic image-bearing member formed of an inorganic or organic material is charged, and the charged electrostatic image-bearing member is exposed to form an electrostatic latent image. After that, the electrostatic latent image is developed with triboelectrically charged toner, and the toner image is transferred onto a recording medium such as paper, followed by fixation of the toner image onto the recording medium. Thus, a desired image is formed on the recording medium.

As a transfer system of the electrophotographic apparatus, there has been used an intermediate transfer system in which an unfixed toner image on the electrostatic image-bearing member is primarily transferred onto an intermediate transfer member, and further, the unfixed toner image is secondarily transferred from the intermediate transfer member onto the recording medium. Such intermediate transfer system has the following advantage particularly in a color electrophotographic apparatus: a high-quality image is obtained with little influences of a thickness and surface characteristics of the recording medium because toners of four colors (yellow, magenta, cyan, and black) are sequentially transferred onto the intermediate transfer member and the resultant superimposed image is collectively transferred onto the recording medium. In order to realize a higher image quality in the intermediate transfer system, it is important to enhance toner releasability of a surface of the intermediate transfer member, to thereby improve the transfer of the toner image onto the recording medium.

In Japanese Patent Application Laid-Open No. 2009-192901, there is a disclosure of a conductive endless belt to be suitably used as an intermediate transfer belt capable of effectively improving the efficiency of the transfer onto the recording medium. That is, in Japanese Patent Application Laid-Open No. 2009-192901, there is a disclosure of a conductive endless belt having a hard coat layer that is formed through the use of a perfluoroalkyl group-containing UV-curable resin and that has a pencil hardness of 4H or more and a contact angle with n-dodecane of 20° or more.

SUMMARY OF THE INVENTION

One aspect of the present invention is directed to providing a transfer member for electrophotography capable of maintaining stable toner releasability over a long period of time.

Another aspect of the present invention is directed to providing an electrophotographic apparatus that facilitates stable formation of a high-quality electrophotographic image.

According to one aspect of the present invention, there is provided a transfer member for electrophotography, including: a substrate; and a surface layer on the substrate, in which the surface layer includes: an acrylic resin having a hydroxyl group; and a fluorine compound, the fluorine compound having an alkyl group including 1 to 8 carbon atoms, and a fluorine atom substituting at least one hydrogen atom in the alkyl group, and including a constitutional unit represented by the following formula (1).

[In the formula (1), n represents an integer of 1 or more and 3 or less.]

According to another aspect of the present invention, there is provided an electrophotographic apparatus, including the above-mentioned transfer member for electrophotography.

Further features of the present invention will become apparent from the following description of exemplary embodiments with reference to the attached drawings.

DESCRIPTION OF THE EMBODIMENTS

Figure 1:
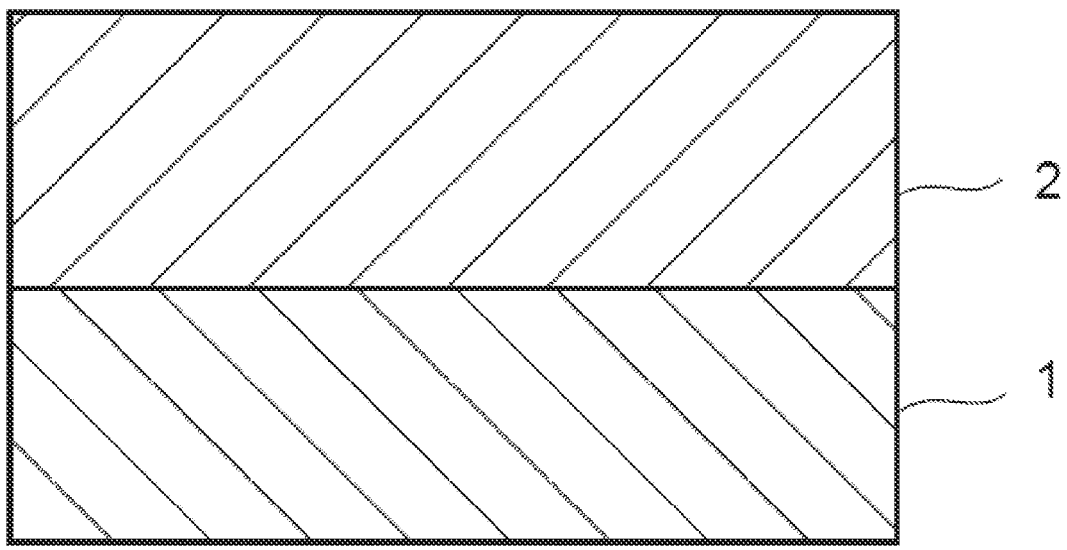
FIG. 1 is a schematic cross-sectional view of a transfer member for electrophotography according to one embodiment of the present invention.

Preferred embodiments of the present invention will now be described in detail in accordance with the accompanying drawings.

In recent years, in order to increase a printing speed required of an electrophotographic apparatus, or to further improve toner transfer efficiency, a voltage to be applied at the time of secondary transfer (hereinafter referred to as "secondary transfer voltage") has been increased. Consequently, there has been a higher risk of the occurrence of an electric discharge phenomenon between the surface of an intermediate transfer member and a transfer roller at the time of the secondary transfer.

As a result of investigations made by the inventors of the present invention, it has been found that electric discharge that occurs between the surface of the intermediate transfer member and the transfer roller may decompose or denature an organic compound present at the surface of the intermediate transfer member to change the surface characteristics of the intermediate transfer member. Such degradation of the surface characteristics of the intermediate transfer member due to the electric discharge is hereinafter referred to as "discharge deterioration".

In this connection, the inventors of the present invention have investigated the intermediate transfer belt according to Japanese Patent Application Laid-Open No. 2009-192901. As a result, because of the chemical bonding of the perfluoroalkyl group in the hard coat layer to the UV-curable resin, excessive exudation (bleeding) of the organic compound to the hard coat surface was hardly observed.

Meanwhile, the measurement of chemical composition in the hard coat surface by X-ray photoelectron spectroscopy (ESCA) showed that the surface initially had a fluorine atom amount of from 10 atom % to 60 atom %. However, after the formation of an electrophotographic image on 1,000 or more sheets, the fluorine atom amount of the surface was found to be several atom % or less. This proves the occurrence of the discharge deterioration. That is, the intermediate transfer belt according to Japanese Patent Application Laid-Open No. 2009-192901 was found to have difficulty in maintaining satisfactory toner releasability over a long period of time.

In view of the foregoing, the inventors of the present invention have made further investigations on a transfer member for electrophotography capable of stably maintaining toner releasability over a long period of time. As a result, the present invention has been attained.

A transfer member for electrophotography according to one aspect of the present invention includes a substrate and a surface layer formed on the substrate. In addition, the surface layer contains: an acrylic resin having a hydroxyl group; and a fluorine compound having an alkyl group including 1 to 8 carbon atoms, and a fluorine atom substituting at least one hydrogen atom in the alkyl group, the fluorine compound including a constitutional unit represented by the following formula (1).

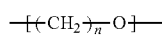
(1)

[In the formula (1), n represents an integer of 1 or more and 3 or less.]

In the transfer member for electrophotography having such construction, the bleeding of the fluorine compound to the surface is suppressed. In addition, even when the transfer member is used in the formation of electrophotographic images over a long period of time, the degradation of its toner releasability is suppressed. As a result, the transfer member facilitates the formation of a high-quality electrophotographic image.

The reason why the transfer member for electrophotography according to the one aspect of the present invention exhibits the effect as described above, is considered as follows.

The fluorine compound has an alkyl group including 1 to 8 carbon atoms, and a fluorine atom substituting at least one hydrogen atom in the alkyl group. When at least one of the presence of such fluorine compound on the surface of the transfer member for electrophotography on which a toner image is to be borne and the presence of such fluorine compound in the surface layer in the vicinity of the surface is achieved, toner releasability in the surface of the member for electrophotography on which a toner image is to be borne becomes satisfactory.

It is often difficult to incorporate a compound having a fluorine atom in the molecule into a binder resin having an acrylic skeleton because of low compatibility therebetween. However, the fluorine compound includes the constitutional unit having a short hydrocarbon chain with n representing from 1 to 3 and an oxygen atom, and hence has weak hydrophilicity. In addition, the acrylic resin has a hydroxyl group, and hence affinity between the fluorine compound and the acrylic resin according to the present invention is high. Thus, the retention property of the fluorine compound in the surface layer is considered to be enhanced to suppress the bleeding. This is supported by the experimental fact that when a surface layer is formed by adding the fluorine compound to an acrylic resin free of a hydroxyl group, the fluorine compound in the surface layer bleeds to the outermost surface.

In addition, the fluorine compound is retained in the surface layer by virtue of a non-covalent hydrophilic interaction with the acrylic resin. Accordingly, even if the fluorine compound present in the surface layer in the vicinity of the surface is decomposed and lost owing to electric discharge and thus the toner releasability is temporarily degraded, the fluorine compound retained inside the surface layer can migrate to the outermost surface to recover the toner releasability.

In general, a compound having a low surface energy, such as a compound having a fluorine atom in the molecule, is localized to the surface of the surface layer. This is presumably because the compound accumulates at an interface between the surface layer and air, at which the energy is most destabilized, in order to minimize the energy of the system. When the fluorine compound localized to the surface is deactivated by electric discharge, the surface energy of the outermost surface rises. Accordingly, the fluorine compound is considered to be supplied from the inside of the surface layer in order to stabilize the energy of the system again, thereby recovering the toner releasability.

On the other hand, in the case of the fluorine compound immobilized to the resin forming the surface layer by chemical bonding as described in Japanese Patent Application Laid-Open No. 2009-192901, even when the fluorine compound at the outermost surface is decomposed by electric discharge, the fluorine compound is hardly supplied from the inside. Accordingly, when the toner releasability is impaired by electric discharge, the toner releasability of the surface is not restored. Thus, it may be difficult to maintain stable toner releasability over a long period of time.

Now, exemplary embodiments of the present invention are described.

FIG. 1 illustrates a schematic cross-sectional view of a transfer member for electrophotography according to one embodiment of the present invention. The member for electrophotography of the present invention has a structure in which a surface layer 2 is laminated on a substrate 1. It is generally preferred that the electrical resistance of the transfer member for electrophotography after the formation of the surface layer 2 on the substrate 1 be $1.0 \times 10^8$ Ω·cm or more and $1.0 \times 10^{14}$ Ω·cm or less in terms of volume resistivity. In addition, it is preferred that a surface resistivity measured from the surface layer 2 side be $1.0 \times 10^7$ ohms per square (Ω/□) or more and $1.0 \times 10^{13}$ Ω/□ or less. When the electrical resistance of the transfer member for electrophotography is set within the semiconducting region as described above, a failure in a transferred image due to the lack of a transfer bias caused by charge-up under a low humidity environment or during continuous driving can be suppressed. In addition, a failure in the transferred image due to the leakage of the transfer bias under a high humidity environment can be suppressed. It should be noted that another layer may be present between the substrate 1 and the surface layer 2.

[Substrate]

First, the substrate in the transfer member for electrophotography of the present invention is described. The form of the substrate is typically exemplified by: a semiconducting film or cylindrical endless belt containing a conductive agent in a resin; and a semiconducting roller-shaped product using a metal shaft as a mandrel. Any one of thermosetting and thermoplastic resins may be used as the resin. Examples of the thermoplastic resin include polycarbonate, polyvinylidene fluoride (PVDF), polyethylene, polypropylene, polymethylpentene-1, polystyrene, polyamide, polylactic acid (PLLA), polysulfone, polyarylate, polyethylene terephthalate, polybutylene terephthalate, polyethylene naphthalate, polybutylene naphthalate, polyphenylene sulfide, polyether sulfone, polyether nitrile, thermoplastic polyimide, polyether ether ketone, a thermotropic liquid crystal polymer, and polyamidic acid. In addition, examples of the thermosetting resin include thermosetting polyimide, a phenol resin, a polyester resin, an amino resin, an epoxy resin, a melamine resin, a thermosetting polyurethane resin, a thermosetting acrylic resin, and a fluorine-modified resin. The resins each may be used alone, or may be used as a blend or an alloyed mixture.

A method of forming the substrate is not particularly limited, and may be appropriately selected depending on purposes. For example, a molding method such as inflation molding, extrusion molding, stretch molding, blow molding, transfer molding, compression molding, or calender molding may be appropriately selected to obtain the substrate of the transfer member for electrophotography.

An electron conductive substance or an ion conductive substance may be used as the conductive agent. The following substances may be used as the electron conductive substance: carbon black, antimony-doped tin oxide or titanium oxide, and conductive polymers such as polyaniline, polypyrrole, and polythiophene. In addition, the following substances may be used as the ion conductive substance: sodium perchlorate, lithium perchlorate, an ionic surfactant, i.e., a cationic or anionic surfactant, a nonionic surfactant, and an oligomer or polymer compound having an oxyalkylene repeating unit. In addition, an antioxidant, a UV absorber, a pH adjuster, a cross-linking agent, and a pigment may be added to the substrate as required.

For example, in the case of a thermosetting resin such as polyimide, the substrate may be molded as a seamless belt by: dispersing carbon black as a conductive agent together with polyimide precursor or soluble polyimide and a solvent to prepare a varnish; and using a centrifugal molding apparatus to form a coating, followed by a baking step. In the case of a belt-shaped transfer member for electrophotography, the thickness of the substrate is preferably 10 µm or more and 500 µm or less, particularly preferably 30 µm or more and 150 µm or less. In addition, in the case of using a thermoplastic resin as the resin, carbon black as a conductive agent and the resin, and as necessary, an additive are mixed, and the mixture is melt-kneaded with a twin-screw kneader to produce semiconducting pellets. Next, the pellets are extruded into a sheet, film, or seamless belt shape by melt extrusion. By this method, a semiconducting film may be obtained. Hot pressing or injection molding may be used for the molding, and a molded preform may be subjected to stretch blow to obtain a semiconducting film. In addition, a manufacturing method for a transfer belt as one example of the transfer member for electrophotography of the present invention is not particularly limited, and any other manufacturing method may be used.

[Surface Layer]

Next, the surface layer is described. The surface layer contains a specific binder resin and a specific fluorine compound. Through the use of such surface layer, the degradation of toner releasability due to discharge deterioration that may occur in an electrophotographic process can be suppressed. In addition, excessive bleeding of the fluorine compound from the surface layer can be suppressed. The details are described below.

<Binder Resin>

An example of the binder resin is the acrylic resin having a hydroxyl group. Such binder resin is a polymer or copolymer obtained by using as a monomer a (meth)acrylate having a hydroxyl group. For the purpose of controlling the hardness of the surface layer, the (meth)acrylate having a hydroxyl group may be copolymerized with a (meth)acrylate free of a hydroxyl group. It should be noted that, in this description, the (meth)acrylate is a generic name referring to an acrylate and a methacrylate.

Examples of the (meth)acrylate having a hydroxyl group include 2-hydroxyethyl (meth)acrylate, 1-hydroxypropyl (meth)acrylate, 2-hydroxypropyl (meth)acrylate, 2-hydroxybutyl (meth)acrylate, 4-hydroxybutyl (meth)acrylate, 2-hydroxy-3-phenoxypropyl (meth)acrylate, dipentaerythritol penta(meth)acrylate, dipentaerythritol tetra(meth)acrylate, pentaerythritol tri(meth)acrylate, 2-(meth)acryloyloxyethyl acid phosphate, 2-hydroxy-3-(meth)acryloyloxypropyl methacrylate, glycerin dimethacrylate, and 2-(meth)acryloyloxyethyl succinate.

Examples of the (meth)acrylate free of a hydroxyl group include methyl (meth)acrylate, ethyl (meth)acrylate, butyl (meth)acrylate, lauryl (meth)acrylate, stearyl (meth)acrylate, trifluoroethyl (meth)acrylate, benzyl (meth)acrylate, phenoxyethyl (meth)acrylate, phenoxydiethylene glycol (meth)acrylate, isoamyl (meth)acrylate, isobornyl (meth)acrylate, glycidyl (meth)acrylate, methoxy-triethylene glucol (meth)acrylate, 2-ethylhexyl-diglucol (meth)acrylate, methoxy-polyethylene glycol (meth)acrylate, triethylene glycol di(meth)acrylate, polyethylene glycol di(meth)acrylate, polypropylene glycol di(meth)acrylate, trimethylolpropane tri(meth)acrylate, trimethylolpropane tri(meth)acrylate, isocyanuric acid ethylene oxide-modified tri(meth)acrylate, ditrimethylolpropane tetra(meth)acrylate, pentaerythritol tetra(meth)acrylate, and dipentaerythritol hexa(meth)acrylate.

The monomer for forming the acrylic resin has a hydroxyl value (mg KOH/g) of preferably 10 or more and 120 or less, more preferably 30 or more and 100 or less. When the hydroxyl value is set within the above-mentioned range, the occurrence of the bleeding can be satisfactorily suppressed, and besides, satisfactory toner releasability can be provided with less influence on the restoration speed of the toner releasability (migration speed of the fluorine compound in the surface layer).

The hydroxyl value as used herein may be determined by: acetylating a hydroxyl group in the monomer as a measurement object through the use of a certain weighed amount of acetic anhydride (acetylating reagent) whose concentration is known; and titrating acetic anhydride that has not been used in the acetylation with a potassium hydroxide solution. In this case, the amount of hydroxyl groups contained in 1 g of the sample is represented by the number of mg of potassium hydroxide required for the titration. In addition, when the acrylic resin is formed from a plurality of kinds of monomers, the hydroxyl value of the monomers refers to the hydroxyl value of a mixture of the plurality of kinds of monomers. A detailed measurement method for the hydroxyl value is described later.

<Fluorine Compound>

The fluorine compound has an alkyl group including 1 to 8 carbon atoms, and a fluorine atom substituting at least one hydrogen atom in the alkyl group, and includes a constitutional unit represented by the following formula (1).

(1)

[In the formula (1), n represents an integer of 1 or more and 3 or less.]

The fluorine compound has high compatibility with the above-mentioned binder resin, and in addition, can enhance the retention property in the surface layer containing the binder resin. As a result, while the bleeding of the fluorine compound to the surface of the surface layer is suppressed, the amount of the fluorine compound to be added to the surface layer can be increased.

In addition, in order to further improve the compatibility with the binder resin, and to improve the retention property in the surface layer, it is more preferred that the fluorine compound to be used further have a hydroxyl group in the molecule.

In addition, in order to enhance the toner releasability of the surface layer, it is preferred that all hydrogen atoms of the alkyl group in the fluorine compound be substituted with fluorine atoms. In addition, the number of the alkyl groups in the fluorine compound is at least one.

In the transfer member for electrophotography according to the present invention, even when the fluorine compound present at the surface of the surface layer and in the surface layer in the vicinity of the surface is decomposed and lost by electric discharge, the fluorine compound present inside the surface layer is presumably supplied to recover the toner releasability. Accordingly, it is preferred that the fluorine compound be free of a reactive functional group capable of forming a covalent bond with the binder resin as a base material in the surface layer. Herein, examples of the reactive functional group include an acrylic group and a methacrylic group, each of which has an unsaturated bond.

It is preferred that the content of the fluorine compound in the surface layer be 10 mass % or more with reference to the total mass of the surface layer. In order to further suppress the degradation of the toner releasability, it is preferred to set the content of the fluorine compound to 20 mass % or more. In addition, when the content of the fluorine compound is set to 40 mass % or less, the relative content of the binder resin as the base material in the surface layer can be maintained, and hence a certain surface hardness is obtained. With this, when the transfer member is mounted to an electrophotographic apparatus, abrasion of the surface due to sliding with another sliding member (such as a cleaning blade), and due to toner or a toner external additive present between such member and the surface layer can be suppressed.

It is preferred that the fluorine compound have a structure represented by the following formula (2).

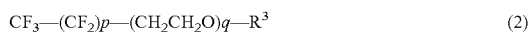

$$CF_3—(CF_2)p—(CH_2CH_2O)q—R^3 \quad (2)$$

[In the formula (2), p represents an integer of 0 or more and 7 or less, q represents an integer of 2 or more and 20 or less, and $R^3$ represents a hydrogen atom or an alkyl group including 1 to 3 carbon atoms.]

In particular, in order to further improve the retention property in the binder resin, it is more preferred that $R^3$ in the fluorine compound represent a hydrogen atom. In this case, the fluorine compound has a hydroxyl group at a terminal, and hence a further hydrophilic interaction with the binder resin is obtained, which enhances the retention property.

The weight-average molecular weight (Mw) of the fluorine compound is not particularly limited, but preferably falls within the range of 400 or more and 1,000 or less. When the weight-average molecular weight of the fluorine compound is 400 or more, the toner releasability of the surface layer is expressed with more ease. When the weight-average molecular weight (Mw) of the fluorine compound is 1,000 or less, the fluorine compound easily migrates to the surface as compared to the case of having a high molecular weight, resulting in a higher self-restoration speed.

In the present invention, the weight-average molecular weight (Mw) may be measured using a measurement method for a molecular weight distribution based on gel permeation chromatography (GPC). The measurement method for a molecular weight distribution based on GPC is described in detail later in Examples.

Examples of such fluorine compound include polyoxyethylene perfluoroalkyl ethers "N-1287", "N-1386-1", and "N-1386-2" (all of which are trade names) manufactured by Dai-ichi Kogyo Seiyaku Co., Ltd. It should be noted that the weight-average molecular weight Mw, and values of p and q and structure of $R^3$ in the formula (2) of each of "N-1287", "N-1386-1", and "N-1386-2" are shown in Table 2 in Examples to be described later.

The surface layer has an average hardness within the range of preferably from 0.10 GPa or more to 0.40 GPa or less, more preferably from 0.20 GPa or more to 0.30 GPa or less in a region of 10% or more and 20% or less in a thickness direction from the outermost surface in a nanoindenter measurement method involving using a Berkovich indenter.

The hardness of the surface layer may be measured using a microindentation hardness tester (trade name: Nano Indenter G200, manufactured by Agilent Technologies, Inc.) and using a Berkovich indenter. It should be noted that a measurement region is a region of 10% or more and 20% or less in the thickness direction from the outermost surface of the surface layer and an average hardness in this region is calculated.

The meaning of the measurement region is as follows: a region of within 10% of the thickness of the surface layer, which is near the outermost surface, is easily affected by the vibration of the indenter, and a region of 20% or more of the thickness of the surface layer is easily affected by the substrate, and hence these regions are excluded from the calculation. When the average hardness of the surface layer is set within the above-mentioned range, the occurrence of physical deterioration such as abrasion or wear due to sliding with a sliding member mounted to an electrophotographic apparatus (such as a cleaning blade), and due to toner or a toner external additive present between such member and the surface layer can be suppressed.

The molecular structure of the fluorine compound may be identified by isolating the fluorine compound from the surface layer by an appropriate method, and using a technique such as pyrolysis GC/MS, NMR, IR, or elemental analysis. In addition, the content of the fluorine compound in the surface layer may be determined based on a quantitative ratio relationship in its extraction from the surface layer. A solvent that does not react with the fluorine compound needs to be selected as a solvent to be used for the extraction. For example, a solvent such as tetrahydrofuran (THF), ethyl acetate, or methyl ethyl ketone (MEK) may be suitably used. As a method for subsequent isolation and purification, there is given a method involving removing the solvent with a rotary evaporator, and isolating the fluorine compound by any of various kinds of chromatography.

[Manufacturing Method for Transfer Member for Electrophotography]

Now, a specific manufacturing method for the transfer member for electrophotography according to the present invention is described by taking a belt-shaped intermediate transfer member as an example.

The monomer for forming the acrylic resin, the fluorine compound including the constitutional unit represented by the formula (1), an additive, a polymerization initiator, and a solvent are mixed and thoroughly stirred to obtain a mixed dispersion liquid. In this case, a photopolymerization initiator Irgacure (Ciba-Geigy) may be appropriately used as the polymerization initiator. In addition, a conductive agent, filler particles, a colorant, or a leveling agent may be used as the additive. The obtained mixed dispersion liquid is applied onto a belt-shaped substrate by an application method such as ring coating, dip coating, spray coating, roll coating, or spin coating. After that, the coating film is dried at a temperature of from 60° C. to 90° C. and the solvent is removed by evaporation, and then the coating film is cured with an apparatus for irradiation with an active energy such as UV light or an electron beam to form a surface layer. Thus, the intermediate transfer member of the present invention may be obtained.

Regarding the thickness of the surface layer, a surface layer having a desired thickness may be appropriately formed by adjusting film forming conditions such as the solid content concentration of the mixed dispersion liquid and a film forming speed. The film thickness of the surface layer is preferably at least 1 µm or more in consideration of abrasion and wear under endurance conditions of actual use, and is preferably 10 µm or less in consideration of bending resistance when the belt is stretched. In addition, when further bending resistance is needed, the film thickness is preferably 5 µm or less.

[Electrophotographic Apparatus]

The transfer member for electrophotography of the present invention may be suitably used as an intermediate transfer member for an electrophotographic apparatus.

Figure 2:
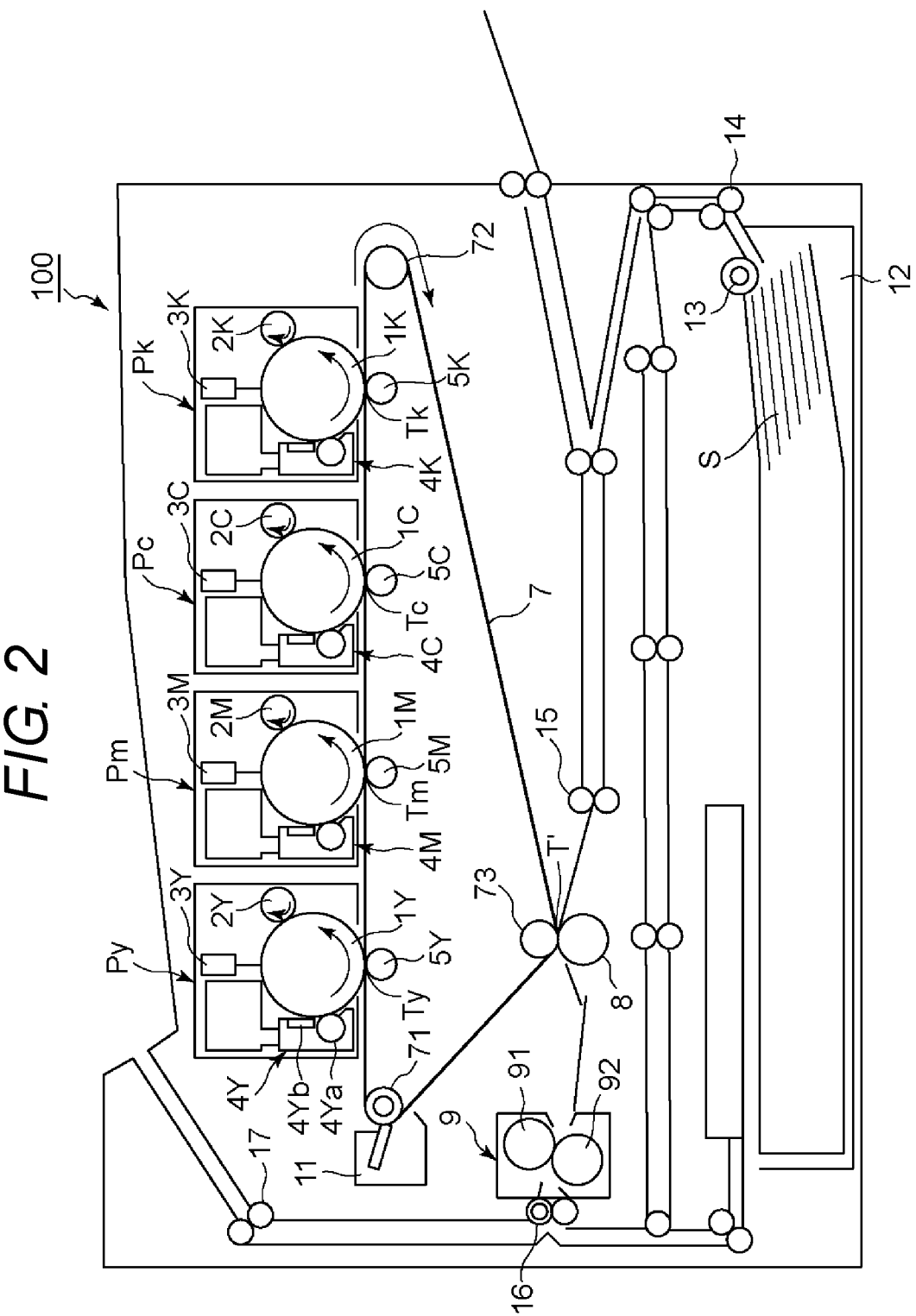
FIG. 2 is a schematic cross-sectional view of an electrophotographic apparatus according to one embodiment of the present invention.

FIG. 2 is a schematic cross-sectional view of an electrophotographic apparatus according to one embodiment of the present invention. An electrophotographic apparatus 100 is a color electrophotographic apparatus (color laser printer) of an electrophotographic system using as an intermediate transfer member an intermediate transfer belt having an endless belt shape. In the electrophotographic apparatus 100, image forming units Py, Pm, Pc, Pk as image forming sections for components of the respective colors of yellow (Y), magenta (M), cyan (C), and black (K) are provided in the stated order along the surface of an intermediate transfer belt 7 in its moving direction. Reference symbols 1Y, 1M, 1C, 1K represent electrophotographic photosensitive members respectively, reference symbols 2Y, 2M, 2C, 2K represent charging rollers respectively, reference symbols 3Y, 3M, 3C, 3K represent laser exposure apparatus respectively, reference symbols 4Y, 4M, 4C, 4K represent developing units respectively, and reference symbols 5Y, 5M, 5C, 5K represent primary transfer rollers respectively. Each of the image forming units has the same basic construction, and hence regarding the details of the image forming units, only the yellow image forming unit Py is described.

The yellow image forming unit Py includes the drum-type electrophotographic photosensitive member (hereinafter sometimes referred to as "photosensitive drum" or "first image-bearing member") 1Y as an image-bearing member. The photosensitive drum 1Y is formed by laminating a charge generating layer, a charge transporting layer, and a surface protective layer in the stated order on a cylinder made of aluminum as a substrate.

In addition, the yellow image forming unit Py includes the charging roller 2Y as a charging device. A charging bias is applied to the charging roller 2Y, and thus the surface of the photosensitive drum 1Y is uniformly charged.

Above the photosensitive drum 1Y, the laser exposure apparatus 3Y as an image exposing device is provided. The laser exposure apparatus 3Y is configured to scan and expose the uniformly charged surface of the photosensitive drum 1Y based on image information to form an electrostatic latent image of the yellow color component on the surface of the photosensitive drum 1Y.

The electrostatic latent image formed on the photosensitive drum 1Y is developed by the developing unit 4Y as a developing device with toner as a developer. That is, the developing unit 4Y includes a developing roller 4Ya as a developer-bearing member, and a regulating blade 4Yb as a developer amount-regulating member, and contains yellow toner as a developer. The developing roller 4Ya having the yellow toner supplied thereto is brought into contact with the photosensitive drum 1Y in a lightly pressed state in a developing section, and is rotated in the forward direction of the photosensitive drum 1Y at a different speed. The yellow toner that has been conveyed to the developing section by the developing roller 4Ya is caused to adhere to the electrostatic latent image formed on the photosensitive drum 1Y by applying a developing bias to the developing roller 4Ya. Thus, a visible image (yellow toner image) is formed on the photosensitive drum 1Y.

The intermediate transfer belt 7 is stretched on a driving roller 71, a tension roller 72, and a driven roller 73, and is moved (driven to rotate) in the direction indicated by an arrow in the figure while being brought into contact with the photosensitive drum 1Y. In addition, the yellow toner image formed on the photosensitive drum having reached a primary transfer section Ty is primarily transferred onto the intermediate transfer belt 7 by the primary transfer roller 5Y, which is brought into pressure contact with the photosensitive drum 1Y in an opposed manner through the intermediation of the intermediate transfer belt 7.

Similarly, the above-mentioned image forming operation is performed in each of the units Pm, Pc, Pk corresponding to magenta (M), cyan (C), and black (K) along with the movement of the intermediate transfer belt 7, to superimpose toner images of the four colors of yellow, magenta, cyan, and black on the intermediate transfer belt 7. The toner layers of the four colors are conveyed in accordance with the movement of the intermediate transfer belt 7, and collectively transferred onto a transfer material S (hereinafter sometimes referred to as "second image-bearing member") conveyed at predetermined timing by a secondary transfer roller 8 as a secondary transfer device in a secondary transfer section T'. In such secondary transfer, a transfer voltage of several kV is generally applied in order to secure a sufficient transfer ratio, and at this time, electric discharge may occur in the vicinity of a transfer nip. It should be noted that the electric discharge is one cause of chemical deterioration of the transfer member.

The transfer material S is stored in a cassette 12 as a storing portion for the transfer material S, and is separated and supplied into the machine by a pick-up roller 13. In the machine, the transfer material S is conveyed to the secondary transfer section T' by a conveying roller pair 14 and a registration roller pair 15 in synchronization with the toner image of the four colors transferred onto the intermediate transfer belt 7.

The toner image transferred onto the transfer material S is fixed by a fixing unit 9 to become, for example, a full-color image. The fixing unit 9 includes a fixing roller 91 provided with a heating device, and a pressing roller 92, and is configured to fix the unfixed toner image on the transfer material S through heating and pressing. After that, the transfer material S is delivered to the outside of the machine by a convey roller pair 16, a delivery roller pair 17, and the like.

A cleaning blade 11 as a cleaning device for the intermediate transfer belt 7 is provided downstream of the secondary transfer section T' in the driving direction of the intermediate transfer belt 7, and is configured to remove transfer residual toner remaining on the intermediate transfer belt 7 instead of being transferred onto the transfer material S in the secondary transfer section T'.

As described above, the electrical transfer process of the toner image is repeated, from the photosensitive member onto the intermediate transfer belt, and from the intermediate transfer belt onto the transfer material. In addition, when recording is repeated on a large number of transfer materials, the electrical transfer process is further repeated.

The transfer member for electrophotography according to the one aspect of the present invention hardly undergoes degradation of the toner releasability due to discharge deterioration, and can suppress the occurrence of excessive bleeding. In addition, the use of the transfer member for electrophotography of the present invention as an intermediate transfer member for an electrophotographic apparatus can suppress the degradation of image quality.

Now, the present invention is described by way of Examples and Comparative Examples. In Examples and Comparative Examples, although some materials for mixed dispersion liquids are diluted/dispersed with solvents, the use amount (mass %) of each material means an amount in terms of nonvolatile content, excluding the solvent (volatile content), unless otherwise stated. Prior to Examples, first, evaluation methods for transfer members for electrophotography and compounds used in the production of the transfer members for electrophotography are described.

[Evaluation 1. Measurement of Hardness of Surface Layer]

The hardness of a surface layer was measured using a microindentation hardness tester (trade name: Nano Indenter G200; manufactured by Agilent Technologies, Inc.) and using a Berkovich indenter. It should be noted that a measurement region was from 10% to 20% in a thickness direction from the outermost surface of the surface layer, and an average hardness in this region was calculated.

[Evaluation 2. Measurement of Hydroxyl Value]

The hydroxyl value of a raw material compound for a binder resin was determined as follows: an acid value was determined with reference to Japanese Industrial Standard (JIS) K 0070 (acetylation method), and hydroxyl value titration analysis based on an indicator titration method was performed, followed by calculation by the following calculation equation (1).

Hydroxyl value (mg KOH/g)=$\{(V_1-V_0) \times f_1 \times 0.5 \times 56.11\}/S_1$+Acid value    Calculation equation (1)

In the calculation equation (1),
$S_1$: mass of collected sample (g)
$V_0$: amount of 0.5 mol/L potassium hydroxide alcohol solution required in blank test (mL)
$V_1$: amount of 0.5 mol/L potassium hydroxide alcohol solution required in actual test (mL)
$f_1$: factor of 0.5 mol/L potassium hydroxide alcohol solution (1.005)
Acid value (mg KOH/g)=$\{(V_3-V_2) \times f_2 \times 0.1 \times 56.11\}/S_2$
$S_2$: mass of collected sample (g)
$V_2$: amount of 0.1 mol/L potassium hydroxide alcohol solution required in blank test (mL)
$V_3$: amount of 0.1 mol/L potassium hydroxide alcohol solution required in actual test (mL)
$f_2$: factor of 0.1 mol/L potassium hydroxide alcohol solution (1.006).

The hydroxyl value titration analysis is described in detail below.

A 200-mL conical flask is charged with about 2 g of a sample as a measurement object and 5 mL of an acetylating reagent, and is then fitted with an air condenser, followed by a reaction in an oil bath at 100° C. for 1 hour. After cooling at room temperature, 1 mL of water is added. The mixture is heated again in an oil bath at 100° C. for 10 minutes. After cooling, the inside of the air condenser and the inner surface of the flask are rinsed with ethanol. The solution is diluted with 30 mL of pyridine. The dilution is titrated with a 0.5 mol/L potassium hydroxide alcohol solution (f=1.005) using a 1% phenolphthalein solution as an indicator, and the point at which a pale red color appears is defined as the end point. A blank test is also performed by a similar method, and the hydroxyl value is calculated by the above-mentioned equation. It should be noted that the acetylating reagent to be used is prepared by weighing 20 g of acetic anhydride in a flask, and then adding pyridine to a volume of 100 mL.

The acid value titration analysis is described in detail below.

A 100-mL conical flask is charged with about 2 g of a sample, 30 mL of ethanol, and 30 mL of 2-butanone, and the contents are dissolved at room temperature. The solution is titrated with a 0.1 mol/L potassium hydroxide alcohol solution (f=1.006) using a 1% phenolphthalein solution as an indicator, and the point at which a pale red color appears is defined as the end point. A blank test is also performed by a similar method, and the acid value is calculated by the above-mentioned equation.

It should be noted that the hydroxyl values, based on Evaluation 2, of raw material compounds for binder resins used in the formation of surface layers of intermediate transfer belts according to Examples and Comparative Examples to be described later are shown in Table 1.

[Evaluation 3. Measurement of Weight-Average Molecular Weight (Mw)]

The weight-average molecular weights (Mw) of fluorine compounds 1 to 3 according to the present invention were measured under the following conditions.

A column was stabilized in a heat chamber at a temperature of 40° C., and toluene was flowed as a solvent through the column at this temperature at a flow rate of 1 mL/min. 100 μL of a toluene sample solution of the fluorine compound prepared to have a sample concentration of 0.3 mass % was injected. In the measurement of the molecular weight of the sample, the molecular weight distribution of the sample was calculated from a relationship between the logarithmic value of a calibration curve prepared with ten kinds of monodisperse polystyrene standard samples (trade name: TSKgel standard polystyrene "005202" to "005211", manufacture by Tosoh Corporation) and a retention time. The apparatus and column used in the measurement are as follows.

GPC apparatus: "GPC gel permeation chromatography analyzer" (trade name: HLC-8220, manufactured by Tosoh Corporation)
Column: polystyrene gel column (trade name: Shodex GPC LF-804, manufactured by Showa Denko K.K.)×3
Detector: differential refractive index detector (trade name: RI-8020, manufactured by Tosoh Corporation)

It should be noted that the weight-average molecular weights (Mw), based on Evaluation 3, of the fluorine compounds 1 to 3 used for the formation of the surface layers of the intermediate transfer belts according to Examples to be described later are shown in Table 2.

[Evaluation 4. Evaluation of Bleeding]

Each of the intermediate transfer belts according to Examples and Comparative Examples was measured for fluorine atom amounts in the fluorine compound at the surface using X-ray photoelectron spectroscopy (ESCA) immediately after the production of each intermediate transfer belt (hereinafter sometimes referred to as "initial time"), and after leaving each intermediate transfer belt to stand under high-temperature and high-humidity (temperature: 40° C., relative humidity: 95%) conditions, under which bleeding was liable to occur, for 24 hours (hereinafter sometimes referred to as "after the acceleration test"). Then, in accordance with the following criteria, the case where a change (increase) in fluorine atom amount of the surface of each intermediate transfer belt between the initial time and the acceleration test was 5 atom % or more was evaluated as "Occurrence of bleeding is present."

Rank A: Occurrence of bleeding is absent.
Rank C: Occurrence of bleeding is present.

[Evaluation 5. Evaluation of Durability]

An intermediate transfer belt made of polyimide provided in an electrophotographic image forming apparatus (trade name: Image RUNNER ADVANCE C5051, manufactured by Canon Inc.) was removed, and in place thereof, an intermediate transfer belt according to each of the following Examples and Comparative Examples was mounted.

Then, a white solid image was output on 10,000 sheets of A4-size plain paper (trade name: CS814, manufactured by Canon Inc.) (hereinafter sometimes referred to as "sheet-passing test"). A fluorine atom amount at the surface was determined by measuring the chemical composition of the surface of the surface layer by X-ray photoelectron spectroscopy (ESCA).

It should be noted that the sheet-passing test was performed under a normal-temperature and normal-humidity (temperature: 25° C., relative humidity: 55%) environment.

[Evaluation 6. Image Evaluation]

An intermediate transfer belt made of polyimide provided in an electrophotographic image forming apparatus (trade name: Image RUNNER ADVANCE C5051, manufactured by Canon Inc.) was removed, and in place thereof, each of intermediate transfer belts No. 1 to 8 according to Examples 1 to 8 was mounted.

Then, an image in which an alphabetical letter "E" having a size of 4 points was formed so as to have a printing density of 2% (hereinafter referred to as "E letter image") was output on 10,000 sheets of A4-size plain paper (trade name: CS814, manufactured by Canon Inc.). It should be noted that the image was formed using a black developer mounted to a print cartridge of the electrophotographic image forming apparatus. In addition, the image was output under a normal-temperature and normal-humidity (temperature: 25° C., relative humidity: 55%) environment.

After the image output, cyan and magenta developers were used to output a solid image of a secondary color on one sheet, and the resultant solid image was evaluated by the following procedure. The solid image was read with a scanner (trade name: CanoScan 9000F, manufactured by Canon Inc.) at a reading resolution of 600 dpi with image correction processing turned off, and was trimmed in the range of 2,550×2,550 pixels (about 10.8×10.8 cm). The resultant image was visually observed while being displayed at a magnification of 200%, and was evaluated as to whether or not image unevenness was found based on the following criteria.

Rank A: Satisfactory with no unevenness found in the image.
Rank B: Comparably satisfactory to Rank A.
Rank C: Unevenness is found in the image.

<Example 1>

As a substrate, an intermediate transfer belt made of polyimide provided in an electrophotographic image forming apparatus (trade name: Image RUNNER ADVANCE C5051, manufactured by Canon Inc.) was used.

Next, 90 parts by mass of "LIGHT ACRYLATE DPE-6A" (trade name, manufactured by Kyoeisha Chemical Co., Ltd.; hydroxyl value: 52 mg KOH/g) as a mixture of dipentaerythritol pentaacrylate having a hydroxyl group and dipentaerythritol hexaacrylate free of a hydroxyl group, and 10 parts by mass of a polyoxyethylene perfluoroalkyl ether (trade name: N-1287, manufactured by Dai-ichi Kogyo Seiyaku Co., Ltd.; weight-average molecular weight Mw=640) were mixed, and the mixture was diluted with methyl isobutyl ketone so as to have a resin solid content concentration of 20%.

Further, with respect to 100 parts by mass in total of the resin components, 25 parts by mass of gallium-doped zinc oxide (manufactured by CIK NanoTek Corporation) as a conductive metal oxide, and 3 parts by mass of a photopolymerization initiator (trade name: Irgacure 184, manufactured by Ciba-Geigy) were mixed, and the resultant mixture was stirred to obtain a mixed dispersion liquid.

The substrate was coated with the mixed dispersion liquid by a slit coating method to form a coating film, which was dried at a temperature of 60° C. for 2 minutes and then irradiated with UV light to be cured, to thereby form a surface layer. It should be noted that the irradiation with UV light was performed using a UV irradiation apparatus (UE06/81-3, manufactured by EYE GRAPHICS CO., LTD.) as a UV light source until a cumulative dose of 1,200 mJ/cm$^2$ was achieved. The thus obtained intermediate transfer belt No. 1 was subjected to Evaluations 1 and 4 to 6. Tables 3 and 4 show the evaluation results.

The intermediate transfer belt No. 1 was satisfactory in the bleeding evaluation, and maintained the fluorine atom amount in the surface in the 10,000-sheet-passing test as well. This is presumably because while the fluorine compound is retained in the surface layer, the fluorine compound present inside the surface layer migrates to compensate even when the fluorine compound in the vicinity of the surface is decomposed and lost by electric discharge.

<Examples 2 to 8>

Intermediate transfer belts No. 2 to 8 were obtained in the same manner as in Example 1 except that in Example 1, the mixed dispersion liquid was prepared with the kind and content of the compound shown in Table 1 or 2. The obtained intermediate transfer belts No. 2 to 8 were subjected to Evaluations 1 and 4 to 6. Tables 3 and 4 show the evaluation results.

<Comparative Example 1>

An intermediate transfer belt No. 9 was obtained in the same manner as in Example 1 except that in the preparation of the mixed dispersion liquid according to Example 1, "LIGHT ACRYLATE DPE-6A" was changed to pentaerythritol tetraacrylate free of a hydroxyl group (trade name: LIGHT ACRYLATE PE-4A, manufactured by Kyoeisha Chemical Co., Ltd.; hydroxyl value: 0 mg KOH/g). The intermediate transfer belt No. 9 was subjected to Evaluations 1 and 4 to 6. Tables 3 and 4 show the evaluation results.

The intermediate transfer belt No. 9 caused excessive bleeding of the fluorine compound to the surface in the bleeding evaluation. It should be noted that in Table 3, the fluorine atom amount in the surface of the intermediate transfer belt No. 9 immediately after the 10,000-sheet-passing test is 0% presumably because the bled fluorine compound was recovered by paper and the cleaner.

<Comparative Examples 2 and 3>

Intermediate transfer belts No. 10 and 11 were obtained in the same manner as in Example 1 except that in the preparation of the mixed dispersion liquid according to Example 1, the modified fluorine compound was changed to fluorine compounds 4 and 5 each having an acrylic group as a reactive functional group shown in Table 2. The intermediate transfer belts No. 10 and 11 were subjected to Evaluations 1 and 4 to 6. Tables 3 and 4 show the evaluation results.

In the intermediate transfer belt No. 10, the fluorine compound was immobilized to the binder resin in the surface layer by chemical bonding, and hence, as shown in Table 3, the bleeding of the fluorine compound to the surface was not found. In addition, after the 10,000th sheet in the sheet-passing test, the amount of the fluorine compound at the surface was found to be reduced. This is presumably due to discharge deterioration of the fluorine compound at the surface.

TABLE 1

| | Binder resin | | | Fluorine compound | |
|---|---|---|---|---|---|
| | Resin component having hydroxyl group | Resin component free of hydroxyl group | Hydroxyl value | Kind | Content (mass %) |
| Example 1 | "LIGHT ACRYLATE DPE-6A" manufactured by Kyoeisha Chemical Co., Ltd. Dipentaerythritol pentaacrylate | Dipentaerythritol hexaacrylate | 52 | Fluorine compound 1 | 10 |
| Example 2 | "LIGHT ACRYLATE DPE-6A" manufactured by Kyoeisha Chemical Co., Ltd. Dipentaerythritol pentaacrylate | Dipentaerythritol hexaacrylate | 52 | Fluorine compound 1 | 20 |
| Example 3 | "LIGHT ACRYLATE DPE-6A" manufactured by Kyoeisha Chemical Co., Ltd. Dipentaerythritol pentaacrylate | Dipentaerythritol hexaacrylate | 52 | Fluorine compound 1 | 30 |
| Example 4 | "LIGHT ACRYLATE DPE-6A" manufactured by Kyoeisha Chemical Co., Ltd. Dipentaerythritol pentaacrylate | Dipentaerythritol hexaacrylate | 52 | Fluorine compound 1 | 40 |
| Example 5 | "Aronix M-402" manufactured by Toagosei Co., Ltd. Dipentaerythritol pentaacrylate | Dipentaerythritol hexaacrylate | 30 | Fluorine compound 1 | 30 |
| Example 6 | "Aronix M-305" manufactured by Toagosei Co., Ltd. Pentaerythritol triacrylate | Pentaerythritol tetraacrylate | 107 | Fluorine compound 1 | 30 |
| Example 7 | "LIGHT ACRYLATE DPE-6A" manufactured by Kyoeisha Chemical Co., Ltd. Dipentaerythritol pentaacrylate | Dipentaerythritol hexaacrylate | 52 | Fluorine compound 2 | 30 |
| Example 8 | "LIGHT ACRYLATE DPE-6A" manufactured by Kyoeisha Chemical Co., Ltd. Dipentaerythritol pentaacrylate | Dipentaerythritol hexaacrylate | 52 | Fluorine compound 3 | 30 |
| Comparative Example 1 | "LIGHT ACRYLATE PE-4A" manufactured by Kyoeisha Chemical Co., Ltd. None | Pentaerythritol tetraacrylate | 0 | Fluorine compound 1 | 30 |
| Comparative Example 2 | "LIGHT ACRYLATE DPE-6A" manufactured by Kyoeisha Chemical Co., Ltd. Dipentaerythritol pentaacrylate | Dipentaerythritol hexaacrylate | 52 | Fluorine compound 4 | 30 |
| Comparative Example 3 | "LIGHT ACRYLATE DPE-6A" manufactured by Kyoeisha Chemical Co., Ltd. Dipentaerythritol pentaacrylate | Dipentaerythritol hexaacrylate | 52 | Fluorine compound 5 | 30 |

TABLE 2

| | | Weight-average molecular weight (Mw) | Formula (2) | | |
|---|---|---|---|---|---|
| | Fluorine compound | | p | q | $R^3$ |
| Fluorine compound 1 | Polyoxyethylene perfluoroalkyl ether "N-1287" manufactured by Dai-ichi Kogyo Seiyaku Co., Ltd. | 640 | 5 | 7 | H |
| Fluorine compound 2 | Polyoxyethylene perfluoroalkyl ether "N-1386-1" manufactured by Dai-ichi Kogyo Seiyaku Co., Ltd. | 490 | 5 | 4 | H |

TABLE 2-continued

| Fluorine compound | | Weight-average molecular weight (Mw) | Formula (2) | | |
|---|---|---|---|---|---|
| | | | p | q | R³ |
| Fluorine compound 3 | Polyoxyethylene perfluoroalkyl ether "N-1386-2" manufactured by Dai-ichi Kogyo Seiyaku Co., Ltd. | 910 | 5 | 13 | H |
| Fluorine compound 4 | "Optool DAC" manufactured by Daikin Industries, Ltd. (Compound containing acrylic group as reactive functional group) | — | — | — | — |
| Fluorine compound 5 | "MEGAFACE RS-75" manufactured by DIC Corporation (Compound containing acrylic group as reactive functional group) | — | — | — | — |

TABLE 3

| | Intermediate transfer belt No. | Bleeding | | | Sheet-passing test | | Surface hardness (GPa) |
|---|---|---|---|---|---|---|---|
| | | Surface fluorine atom amount (atom %) | | | Surface fluorine atom amount (atom %) | | |
| | | Immediately after film formation | After 24 h at 40° C./95% | Evaluation | Initial | After 10k sheets | |
| Example 1 | 1 | 26 | 26 | A | 26 | 11 | 0.34 |
| Example 2 | 2 | 28 | 27 | A | 28 | 19 | 0.29 |
| Example 3 | 3 | 32 | 33 | A | 32 | 25 | 0.25 |
| Example 4 | 4 | 43 | 45 | A | 43 | 31 | 0.19 |
| Example 5 | 5 | 33 | 32 | A | 33 | 28 | 0.34 |
| Example 6 | 6 | 32 | 31 | A | 32 | 14 | 0.22 |
| Example 7 | 7 | 40 | 42 | A | 40 | 35 | 0.23 |
| Example 8 | 8 | 31 | 31 | A | 31 | 23 | 0.27 |
| Comparative Example 1 | 9 | 45 | 55 | C | 45 | 0 | 0.13 |
| Comparative Example 2 | 10 | 45 | 44 | A | 45 | 5 | 0.25 |
| Comparative Example 3 | 11 | 40 | 40 | A | 40 | 3 | 0.26 |

TABLE 4

| | Intermediate transfer belt No. | Image evaluation |
|---|---|---|
| Example 1 | 1 | B |
| Example 2 | 2 | A |
| Example 3 | 3 | A |
| Example 4 | 4 | A |
| Example 5 | 5 | A |
| Example 6 | 6 | B |
| Example 7 | 7 | A |
| Example 8 | 8 | A |

[Evaluation 7. Evaluation of Recoverability of Toner Releasability]

The intermediate transfer belts No. 1, 3, 9, and 10 according to Example 1 and Example 3, and Comparative Example 1 and Comparative Example 2 subjected to Evaluation 4 were each evaluated for the degree of recovery of the toner releasability of the surface over time after the 10,000-sheet-passing test based on a contact angle with hexadecane (hereinafter sometimes referred to as "hexadecane contact angle").

The hexadecane contact angle was calculated by a sessile drop method (θ/2 method) based on measurement using a contact angle meter (trade name: DropMaster 500, manufactured by Kyowa Interface Science Co., Ltd.). Specifically, 1,000 μL of hexadecane was placed on a measurement sample, and 1 second after the separation of the drop from a needle tip was defined as the timing of measurement. For each intermediate transfer belt, hexadecane contact angles at randomly selected three sites were calculated, and the arithmetic average value thereof was adopted as the hexadecane contact angle of the intermediate transfer belt. The measurement was performed within 1 hour from, 6 hours after, 12 hours after, 24 hours after, and 72 hours after the completion of the output of the white solid image on 10,000 sheets. Table 5 shows the results.

TABLE 5

| | Intermediate transfer belt No. | Hexadecane contact angle (°) | | | | | |
|---|---|---|---|---|---|---|---|
| | | Immediately after film formation | Elapsed time after sheet-passing test (h) | | | | |
| | | | Immediately after | 6 | 12 | 24 | 72 |
| Example 1 | 1 | 54 | 30 | 37 | 43 | 45 | 51 |
| Example 3 | 3 | 59 | 50 | 55 | 57 | 58 | 59 |
| Comparative Example 1 | 9 | 69 | 9 | 8 | 7 | 9 | 8 |
| Comparative Example 2 | 10 | 68 | 11 | 12 | 9 | 11 | 11 |

As shown in Table 5 above, in each of the intermediate transfer belts No. 1 and 3 according to Examples 1 and 3, the toner releasability of the surface was found to recover to a state immediately after the film formation over time after the 10,000-sheet-passing test.

In contrast, in the intermediate transfer belt No. 9 according to Comparative Example 1, the recovery of the toner releasability was not found. This was presumably because the fluorine compound contained in the surface layer bled and was removed by paper or the like during the sheet-passing test, with the result that the fluorine compound in an amount allowing the recovery of the toner releasability was not retained in the surface layer.

Further, also in the intermediate transfer belt No. 10, as shown in Table 5, the recovery of the hexadecane contact angle of the surface was not found after the 10,000-sheet-passing test. This is presumably because the fluorine compound is immobilized to the binder resin in the surface layer by chemical bonding, and hence the fluorine compound is hardly supplied from the inside of the surface layer after discharge deterioration of the fluorine compound that has been present at the surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-109045, filed May 27, 2014, Japanese Patent Application No. 2014-181360, filed Sep. 5, 2014, and Japanese Patent Application No. 2015-054046, filed Mar. 17, 2015, which are hereby incorporated by reference herein in their entirety.

What is claimed is:

1. A transfer member for electrophotography, comprising:
   a substrate; and
   a surface layer on the substrate,
   wherein the surface layer comprises:
      an acrylic resin having a hydroxyl group; and
      a fluorine compound,
      the fluorine compound
         having an alkyl group including 1 to 8 carbon atoms, and a fluorine atom substituting at least one hydrogen atom in the alkyl group, and
         comprising a constitutional unit represented by the following formula (1):

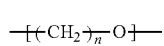  (1)

in the formula (1), n represents an integer of 1 or more and 3 or less.

2. A transfer member for electrophotography according to claim 1, wherein the fluorine compound has a structure represented by the following formula (2):

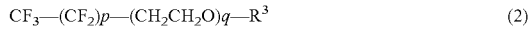  (2)

in the formula (2), p represents an integer of 0 or more and 7 or less, q represents an integer of 2 or more and 20 or less, and $R^3$ represents a hydrogen atom or an alkyl group including 1 to 3 carbon atoms.

3. A transfer member for electrophotography according to claim 2, wherein $R^3$ represents a hydrogen atom.

4. A transfer member for electrophotography according to claim 1, wherein a content of the fluorine compound in the surface layer is 10 mass % or more and 40 mass % or less.

5. A transfer member for electrophotography according to claim 4, wherein the content of the fluorine compound in the surface layer is 20 mass % or more and 40 mass % or less.

6. A transfer member for electrophotography according to claim 1, wherein a monomer for forming the acrylic resin has a hydroxyl value (mg KOH/g) of 10 or more and 120 or less.

7. A transfer member for electrophotography according to claim 6, wherein the monomer for forming the acrylic resin has a hydroxyl value (mg KOH/g) of 30 or more and 100 or less.

8. A transfer member for electrophotography according to claim 1, wherein the fluorine compound has a weight-average molecular weight (Mw) of 400 or more and 1,000 or less.

9. A transfer member for electrophotography according to claim 1, wherein the surface layer has an average hardness within a range of 0.10 GPa or more and 0.40 GPa or less in a region of from 10% to 20% in a thickness direction from an outermost surface in a nanoindenter measurement method involving using a Berkovich indenter.

10. A transfer member for electrophotography according to claim 1, wherein the transfer member for electrophotography has an endless belt shape.

11. An electrophotographic apparatus, comprising the transfer member for electrophotography of claim 1.

12. An electrophotographic apparatus according to claim 11, comprising:
   an electrostatic image-bearing member;
   an intermediate transfer member onto which an unfixed toner image formed on the electrostatic image-bearing member is to be primarily transferred; and
   a secondary transfer device configured to secondarily transfer, onto a recording medium, the toner image transferred onto the intermediate transfer member,
   wherein the intermediate transfer member comprises the transfer member for electrophotography.

* * * * *